US012638084B2

(12) United States Patent
Richardson

(10) Patent No.: US 12,638,084 B2
(45) Date of Patent: May 26, 2026

(54) ELBOW GLOBE VALVE

(71) Applicant: Fisher Controls International LLC, Marshalltown, IA (US)

(72) Inventor: Jonathan W. Richardson, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 18/319,221

(22) Filed: May 17, 2023

(65) Prior Publication Data

US 2024/0384800 A1 Nov. 21, 2024

(51) Int. Cl.
*F16K 1/54* (2006.01)

(52) U.S. Cl.
CPC ..................................... *F16K 1/54* (2013.01)

(58) Field of Classification Search
CPC ..... F16K 1/54; F16K 1/34; F16K 1/36; F16K 1/42; F16K 1/52
See application file for complete search history.

(56) References Cited

U.S. PATENT DOCUMENTS

| | | | | |
|---|---|---|---|---|
| 3,435,850 A | * | 4/1969 | Lucien | F16K 1/44 |
| | | | | 137/625.34 |
| 3,598,145 A | * | 8/1971 | Wolfson | F16K 15/06 |
| | | | | 251/360 |
| 3,671,009 A | * | 6/1972 | Stampfli | F16K 1/42 |
| | | | | 251/86 |
| 3,821,968 A | * | 7/1974 | Barb | F16K 47/04 |
| | | | | 251/210 |
| 4,526,341 A | * | 7/1985 | Thomas | F16K 41/10 |
| | | | | 251/63.5 |
| 4,593,881 A | * | 6/1986 | Yoshino | F25B 41/35 |
| | | | | 251/282 |
| 4,623,002 A | * | 11/1986 | Schoonover | F16K 11/044 |
| | | | | 137/340 |
| 4,687,017 A | * | 8/1987 | Danko | F16J 15/04 |
| | | | | 251/63.5 |
| 4,712,576 A | * | 12/1987 | Ariizumi | F16K 31/003 |
| | | | | 92/182 |
| 4,828,219 A | * | 5/1989 | Ohmi | F16K 7/14 |
| | | | | 251/118 |
| 4,828,220 A | * | 5/1989 | Hashimoto | F16K 31/007 |
| | | | | 251/65 |
| 4,840,347 A | * | 6/1989 | Ariizumi | F16K 31/1225 |
| | | | | 251/63.4 |
| 5,253,671 A | * | 10/1993 | Kolenc | F16K 41/12 |
| | | | | 92/13.41 |
| 5,553,635 A | * | 9/1996 | Gregoire | F16K 41/10 |
| | | | | 251/282 |
| 5,586,745 A | * | 12/1996 | Knapp | F16K 1/38 |
| | | | | 251/903 |
| 5,597,009 A | * | 1/1997 | Scherrer | F16K 51/02 |
| | | | | 62/50.7 |

(Continued)

*Primary Examiner* — Craig M Schneider
*Assistant Examiner* — Christopher D Ballman
(74) *Attorney, Agent, or Firm* — Quarles & Brady LLP

(57) ABSTRACT

A globe valve assembly can include a globe valve that can include a valve stem that defines a valve stem axis, a valve seat, a plug secured at a distal end of the valve stem, and a valve body that supports the valve seat. The valve body can define an inlet passage that extends between an inlet opening and the valve seat and an outlet passage that extends between an outlet opening and the valve seat.

18 Claims, 7 Drawing Sheets

(56)  References Cited

U.S. PATENT DOCUMENTS

| | | | | |
|---|---|---|---|---|
| 5,779,224 A * | 7/1998 | Fukano | .................. | F16K 41/12 |
| | | | | 251/64 |
| 6,000,416 A * | 12/1999 | Kingsford | ............. | F16K 41/103 |
| | | | | 251/63.5 |
| 6,289,922 B1 * | 9/2001 | Nakano | .............. | F16K 31/0655 |
| | | | | 137/454.6 |
| 6,293,513 B1 * | 9/2001 | Birkelund | ............. | F16K 31/408 |
| | | | | 251/30.03 |
| 7,143,956 B2 * | 12/2006 | Fukano | .................. | F16K 23/00 |
| | | | | 251/63.5 |
| 7,357,373 B2 * | 4/2008 | Hayashi | ............... | F16K 31/124 |
| | | | | 251/330 |
| 7,434,780 B2 * | 10/2008 | Hayashi | ............. | F16K 31/1221 |
| | | | | 251/12 |
| 8,087,641 B2 * | 1/2012 | Masamura | ........... | F16K 31/122 |
| | | | | 251/367 |
| 8,215,611 B2 * | 7/2012 | Scudamore | ............. | F16K 31/10 |
| | | | | 251/77 |
| 8,322,364 B2 * | 12/2012 | Lacasse | ............. | F16K 27/0281 |
| | | | | 137/271 |
| 8,689,817 B2 * | 4/2014 | Leys | .................. | F16K 27/0236 |
| | | | | 251/63.6 |
| 8,840,082 B2 * | 9/2014 | Takeda | ................ | F16K 27/0236 |
| | | | | 251/63.5 |
| 9,243,733 B2 * | 1/2016 | Lively | .................... | G05D 16/02 |
| 9,354,638 B2 * | 5/2016 | Rebreanu | .................. | F16K 1/12 |
| 9,366,342 B2 * | 6/2016 | Labrie | ....................... | F16K 1/36 |
| 9,638,345 B2 * | 5/2017 | Okita | ........................ | F16K 7/14 |
| 10,302,224 B2 * | 5/2019 | Kluz | ....................... | F16K 47/08 |
| 10,344,877 B2 * | 7/2019 | Roche | .................... | B60L 1/003 |
| 10,520,099 B2 * | 12/2019 | Corso | ...................... | F16K 1/42 |
| 10,969,019 B2 * | 4/2021 | Yasuda | .................... | F16K 1/54 |
| 11,333,256 B2 * | 5/2022 | Oike | ...................... | F16K 1/385 |
| 11,408,537 B2 * | 8/2022 | Doi | .................... | F16K 31/1221 |
| 11,719,345 B1 * | 8/2023 | Hostetter | ................. | F16K 1/42 |
| | | | | 251/210 |
| 2013/0025723 A1 * | 1/2013 | Dutrop | ................... | F16K 47/08 |
| | | | | 251/118 |
| 2014/0053931 A1 * | 2/2014 | Whitaker | ........... | F16K 11/0853 |
| | | | | 137/625.17 |
| 2014/0306132 A1 * | 10/2014 | Hasunuma | ............... | F16K 1/54 |
| | | | | 251/122 |
| 2016/0123491 A1 * | 5/2016 | Chiba | ................ | F16K 31/1221 |
| | | | | 156/345.24 |
| 2019/0107207 A1 * | 4/2019 | Oike | ........................ | F16K 1/38 |
| 2022/0196155 A1 * | 6/2022 | Lee | ........................ | F16K 1/443 |
| 2023/0193861 A1 * | 6/2023 | Sugihara | ............... | F02M 26/70 |
| | | | | 251/318 |

* cited by examiner

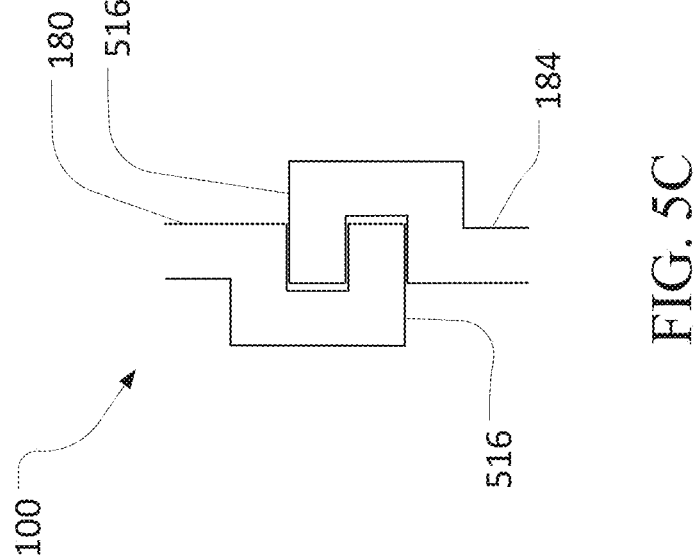
FIG. 5C
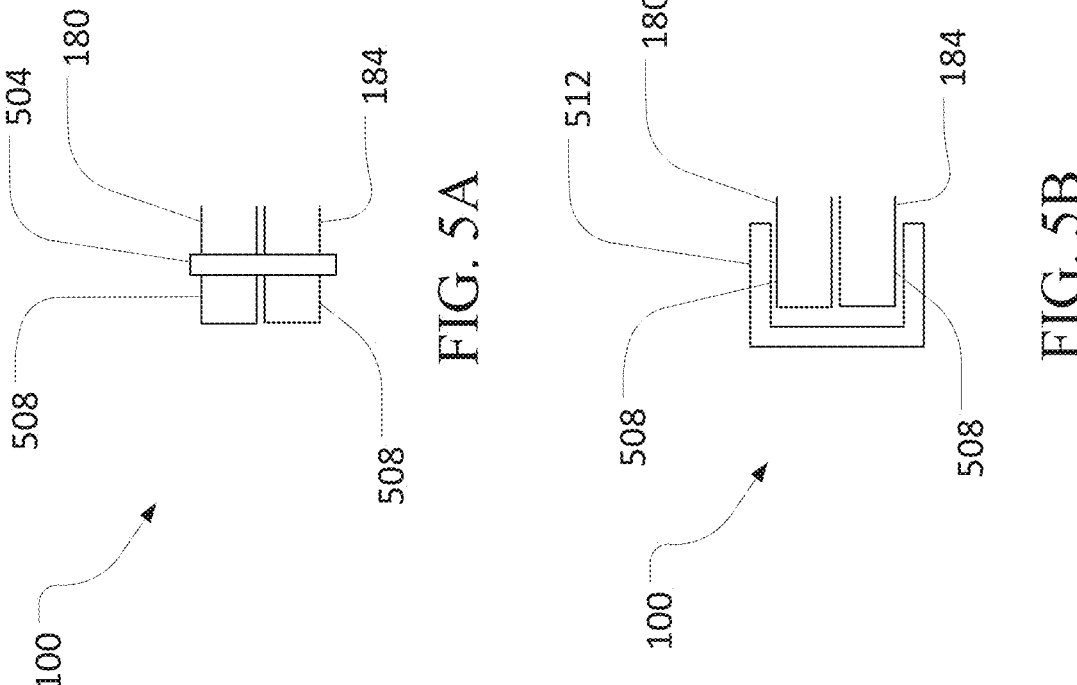
FIG. 5A
FIG. 5B

ELBOW GLOBE VALVE

BACKGROUND

Control valves, as part of control valve assemblies, typically consist of a valve body, internal trim parts, an actuator to provide the power to operate the valve, and a variety of additional valve accessories.

The discussion above is merely provided for general background information and is not intended to be used as an aid in determining the scope of the claimed subject matter.

SUMMARY

Embodiments of the invention, as generally disclosed herein, can relate to globe valve assemblies, and in particular to an elbow globe valve that can be arranged in an actuator-vertical orientation and can simultaneously serve as an angular piping transition piece for fluid flow to simplify maintenance and service needs. In some cases, the elbow globe valve can include a 90-degree valve inlet or outlet. In some cases, the elbow globe valve can include a 270-degree valve inlet or outlet. In some embodiments, the elbow globe valve can include custom casting patterns to provide any inlet (or outlet) angle relationship within a 360-degree pattern that can allow for significant reduction in piping expenses through the elimination of piping elbows.

According to some aspects of the disclosure, a globe valve assembly is provided. The globe valve assembly can include a globe valve. The globe valve can include a valve stem that defines a valve stem axis, a valve seat, a plug secured at a distal end of the valve stem to be moved related to the valve seat by movement of the valve stem to control flow across the valve seat, and a valve body that supports the valve seat. The valve body can define an inlet passage that extends between an inlet opening and the valve seat and an outlet passage that extends between an outlet opening and the valve seat. The inlet opening can define an inlet flow orientation and the outlet opening can define an outlet flow orientation. As projected onto a reference plane that is perpendicular to the valve stem, the inlet flow orientation can have an angular offset relative to the outlet flow orientation.

According to some aspects of the disclosure, a method of forming a globe valve assembly is provided. The method can include forming a valve body to support a valve seat. The valve body can define an inlet opening, an outlet opening, a seat passage for flow across a valve seat, an inlet passage that extends between the inlet opening and the seat passage, and an outlet passage that extends between the outlet opening and the seat passage. The inlet opening can define an inlet flow orientation and the outlet opening can define an outlet flow orientation. The inlet and outlet flow orientations can be configured to be angularly offset as projected onto a common reference plane.

According to some aspects of the disclosure, a method of installing a globe valve assembly is provided. The method can include providing a globe valve that can include a valve body that supports a valve seat, a valve stem movably secured to the valve body to define a valve stem axis, a plug secured at a distal end of the valve stem to be moved relative to the valve seat by movement of the valve stem to control flow across the valve seat. The valve body can define an inlet passage that extends between an inlet opening and the valve seat and an outlet passage that extends between an outlet opening and the valve seat. The method can further include aligning the valve body so that the valve stem axis extends substantially vertically, the inlet opening defines a horizontal inlet flow orientation, and the outlet opening defines a horizontal outlet flow orientation that extends perpendicularly or obliquely relative to the horizontal inlet flow orientation. The method can further include securing an inlet flow conduit at the inlet opening and an outlet flow conduit at the outlet opening.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIGS. 5A through 5C are schematic illustrations of arrangements to connect two body portions of the globe valve assembly of FIG. 1;

DETAILED DESCRIPTION

Figure 1:
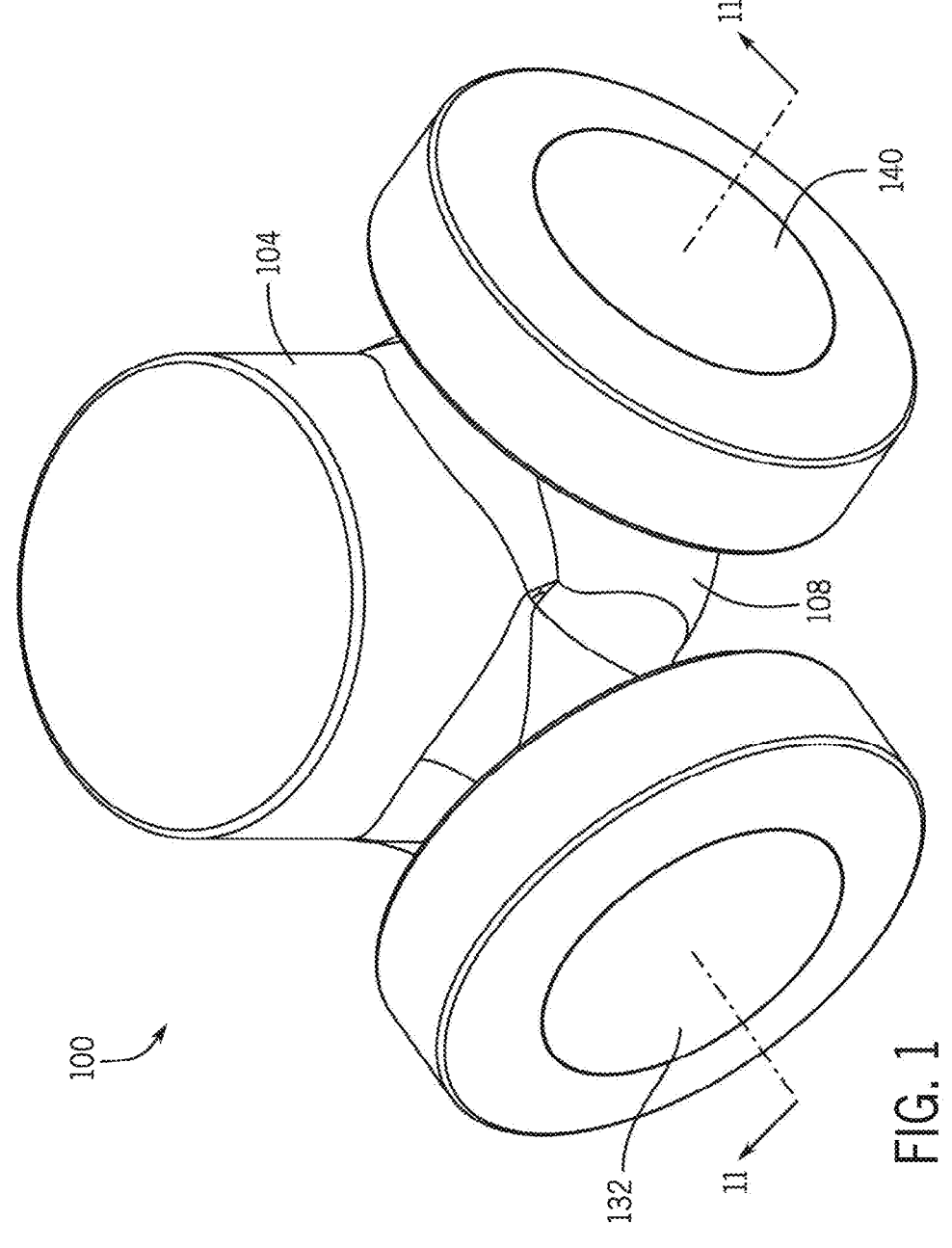
FIG. 1 is a perspective view of a globe valve assembly, according to aspects of the disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Control valves can be used in a variety of process industries to regulate the rate of fluid flow with the force from the actuator changing the position of a valve plug. Different styles of control valve bodies have been developed, the most common style being single-port valve bodies, available in various forms, such as globe and angle valves. In some applications, it may be useful to use an angle valve and piping elbow to change the direction of fluid flow.

Traditional globe valves are commonly used within all process industries. Generally, globe valves can be separated into two categories: angle and globe. A globe valve typically includes parallel-direction inlet and outlet flows, with an intervening seat and valve member to control flow. An angle valve is similar to a globe valve design, with the inlet and outlet ports perpendicular to each other, typically with an inlet (or outlet) extending radially relative to a valve stem axis and an outlet (or inlet) extending in parallel with the valve stem axis. Both arrangements typically use a linear motion valve actuator, a mechanical device that uses a power source to move a closure member into and out of a seating surface.

Angle valves are typically installed in an actuator-vertical orientation with fluid entering the side and exiting the bottom. If an end user wishes to use an angle valve to combine the function of a valve with the function of a piping elbow, the user must also accept a change in piping direction (i.e. horizontal to vertical) in order to keep the actuator vertical.

To change fluid flow orientations, conventional solutions have used an arrangement of straight pipe, to elbow, to straight pipe. However, this arrangement can result in erosion of piping and swirling of fluid, the latter of which can result in some volume of unused pipe space and thereby reduce efficiency. Other conventional solutions incorporate a horizontal actuator installation so that all piping can be maintained in a horizontal orientation. However, horizontal actuator installations can adversely affect valve performance, including by reducing the valve trim life due to side loading and other forces associated with gravity, and can introduce significant challenges with serviceability. Further, these conventional horizontal arrangements are typically limited to a strict 90 degree turn of the fluid.

To provide more efficient valves, some embodiments of the disclosed technology can provide a control valve that maintains an actuator-vertical orientation while also providing an angular change in flow orientation. In particular cases, such control valves can be prepared through the uses of modern casting pattern design and fabrication technologies, including additive manufacturing. Some embodiments of the disclosed technology can provide a top-entry trim horizontal angle valve, thereby providing faster and simplified access for maintenance. Some embodiments of the disclosed technology can provide a 90-degree offset between flow inlet and outlet. Other embodiments of the disclosed technology can provide any variety of other inlet or outlet angle relationships (e.g., adjustably within a 360-degree range), thereby allowing a wide range of rotational orientations.

FIG. 1 partially illustrates a globe valve assembly 100 that includes a globe valve 104. The globe valve 104 can include a valve stem 168 (see, e.g., FIG. 2) and corresponding trim (not shown, but of various known configurations), a valve body 108, an inlet opening 132, and an outlet opening 140. In the illustrated embodiment, the globe valve assembly 100 includes a globe valve 104 with a 90 degree offset between inlet and outlet flow orientations. In other embodiments, as also further discussed below, a globe valve assembly can include a configuration of the globe valve 104 that can provide a different flow offset (e.g., to any of a plurality of angles within a 360-degree range).

Figure 2:
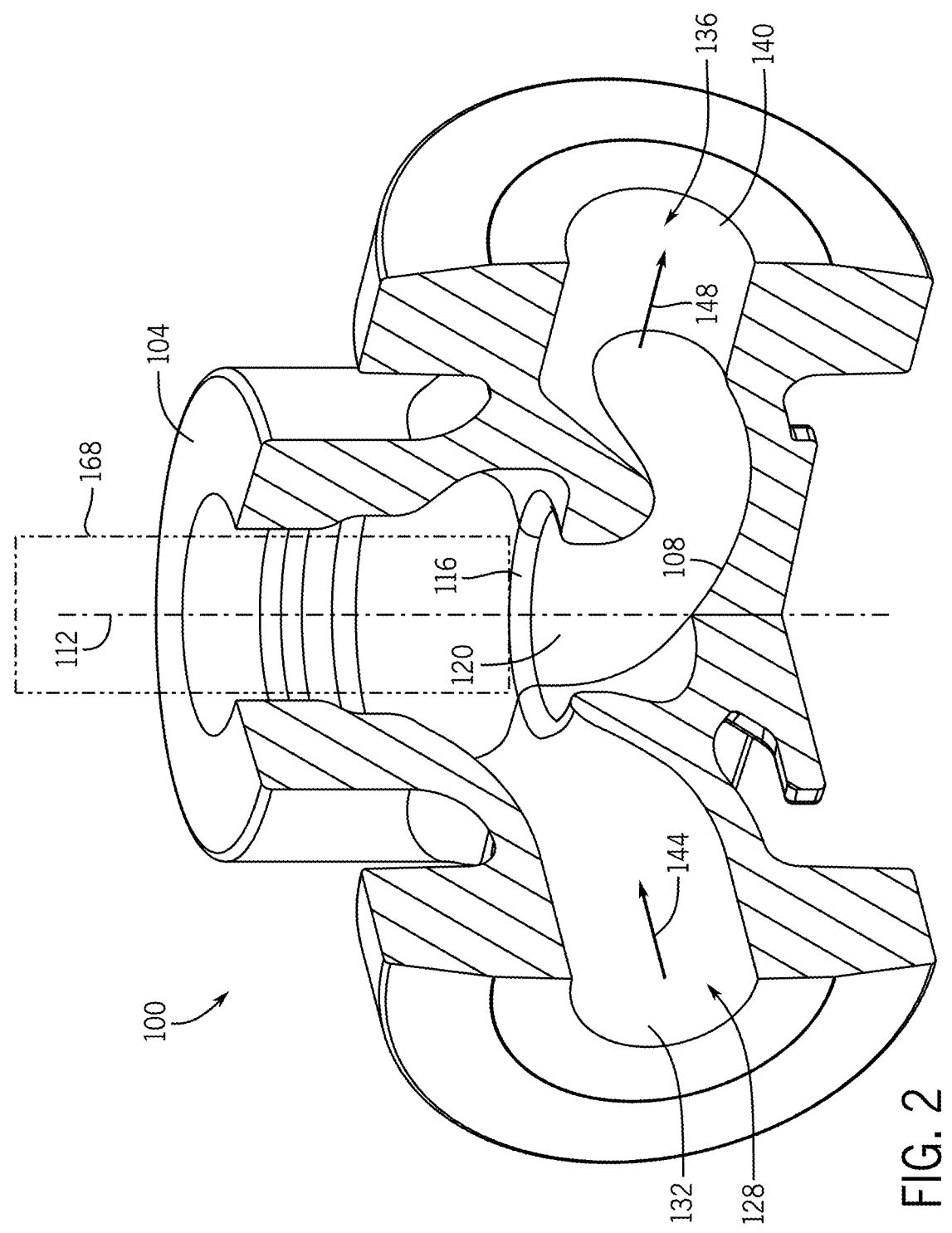
FIG. 2 is a section view of the globe valve assembly of FIG. 1 taken as indicated by planes II-II in FIG. 1.

FIG. 2 illustrates an example internal configuration for the globe valve assembly 100 according to an embodiment of the invention. In the illustrated example, the valve body 108 of the globe valve 104 defines a valve stem axis 112 and a valve seat 116 (e.g., integrally formed as shown, although inserts can be used in some cases). Accordingly generally known principles, a plug (not shown) secured at a distal end of the valve stem can be moved relative to the valve seat 116 by movement of the valve stem to control flow across the valve seat 116. The valve body 108 can define an inlet passage 128 that extends between the inlet opening 132 and the valve seat 116 and an outlet passage 136 that extends between an outlet opening 140 and the valve seat 116. (Those of skill in the art will recognize that the inlet and outlet passages 128, 136 can instead be outlet and inlet passages, respectively, depending on the particular installed configuration of the valve assembly 100.)

The valve seat 116 can generally be a ring of particular material, depending on the particular application for the globe valve assembly 100, that forms a seal with the plug. For example, the material, shape, and size for the valve seat 116 can be selected accordingly for hygienic applications (e.g. food prep) or for other particular process flows (e.g., steam). By thus providing such a seal, when the plug is lifted, a generally annular flow area can be created for flow past the lip of the valve seat 116 and the plug, and through the glove valve 104.

In some embodiments, according to generally known principles, the globe valve assembly 100 can include a bonnet (not shown) secured to a top of the valve body 108. The bonnet can include a stem passage (not shown) to guide movement of the valve stem. At least one packing set (not shown) can be arranged within the stem passage and surround the valve stem to prevent fluid leaks from entering the valve stem and valve body 108.

In some embodiments, forming the valve body 108 can include integrally forming the valve body 108 (e.g., by casting or additive manufacturing). In some cases, forming the valve body 108 can include additively (or otherwise) forming one or more distinct body portions of the valve body 108. For example, as further discussed relative to FIG. 4, the valve body 108 can include multiple upper body portions that can in some cases be selectively secured to each other in a customizable relative angular orientation.

Figure 3:
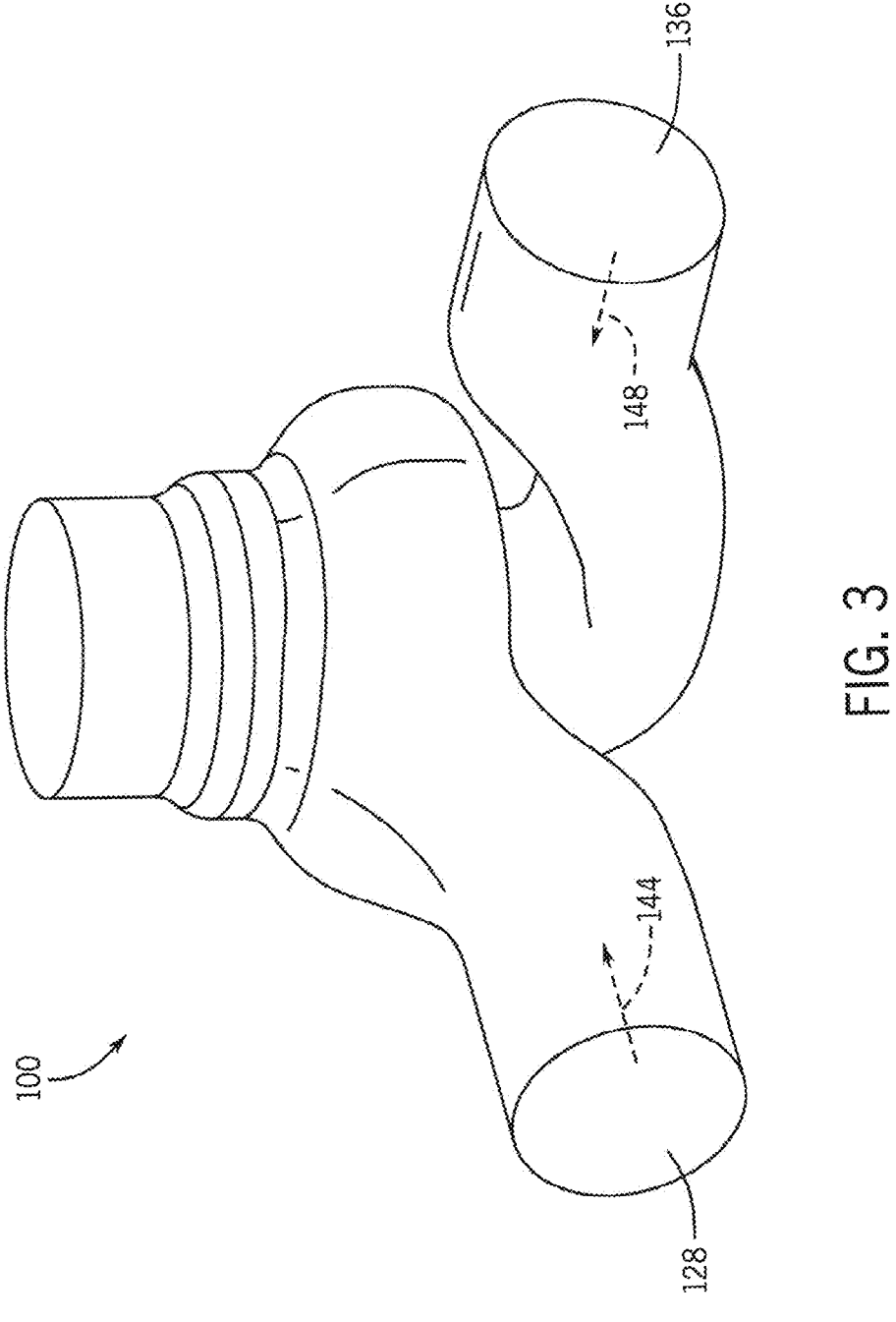
FIG. 3 is a perspective view representing an interior volume of the globe valve assembly of FIG. 1, according to aspects of the disclosure.

As shown in FIGS. 2 and 3, the inlet opening 132 defines an inlet flow orientation 144 and the outlet opening 140 defines an outlet flow orientation 148. (As briefly noted above, FIG. 3 illustrates an example internal volume defined by the valve body 108.) As projected onto a reference plane that is perpendicular to the valve stem axis 112, the inlet flow orientation 144 has an angular offset relative to the outlet flow orientation 148. In some cases, the inlet flow orientation 144 can have an angular offset that extends substantially perpendicular to the outlet flow orientation 148. In some embodiments, the inlet flow orientation 144 can have an angular offset that extends obliquely or acutely to the outlet flow orientation 148. In other words, various examples can include configurations in which, as projected onto a common reference plane, there is a change in flow orientation at the outlet, as compared to the inlet. In the illustrated example, the globe valve assembly 100 defines a 90 (or 270)

degree offset between the inlet and outlet flow orientations 144, 148. In other embodiments, a globe valve assembly can provide other offsets, including at any range of positions within a 360-degree range.

In some cases, the inlet flow orientation 144 and the outlet flow orientation 148 can be vertically offset from a reference plane and each other so that flow into the valve body 108 is at a higher or lower height than flow out of the valve body (e.g., in a z-flow orientation, with the inlet and outlet flow orientations being vertically offset from each other, but substantially parallel to the reference plane). In some embodiments, the inlet flow orientation 144 and the outlet flow orientation 148 can be aligned along (or relative to an offset from) the reference plane, so that there is no vertical offset.

In some embodiments, the globe valve assembly 100 can include the globe valve 104 secured to an inlet flow conduit (not shown) at the inlet opening 132 and secured to an outlet flow conduit (not shown) at the outlet opening 140, so that the plug 120 can be arranged to control flow from the inlet flow conduit to the outlet flow conduit via the globe valve 104. In this arrangement, the valve stem axis 112 can be substantially vertical. In some cases, the inlet flow conduit and the outlet flow conduit can be a pipe (e.g., attached using known approaches to flanges or other known connection structures on the valve body 108 at the inlet and outlet openings 132, 140). In some cases, the conduit can be an inlet or outlet of another flow component (e.g. another valve assembly, a filter assembly, a tank). In some embodiments, one or more of the inlet flow orientation 144 and the outlet flow orientation 148 can be substantially horizontal. In some embodiments, both the inlet flow orientation 144 and the outlet flow orientation 148 can be substantially horizontal.

As noted above, in some examples, different body portions of a valve can be selectively rotatable relative to provide any of a plurality of angular orientations and thereby define any of a corresponding plurality of angular offset between inlet and outlet flow orientations. In some examples, an upper body portion and a lower body portion can be configured to provide a continuous range of adjustments to any of a plurality of desired angular orientations. In some examples, body portions can be otherwise adjustable (e.g., to any of a plurality of pre-defined, discrete angular orientations).

Figure 4:
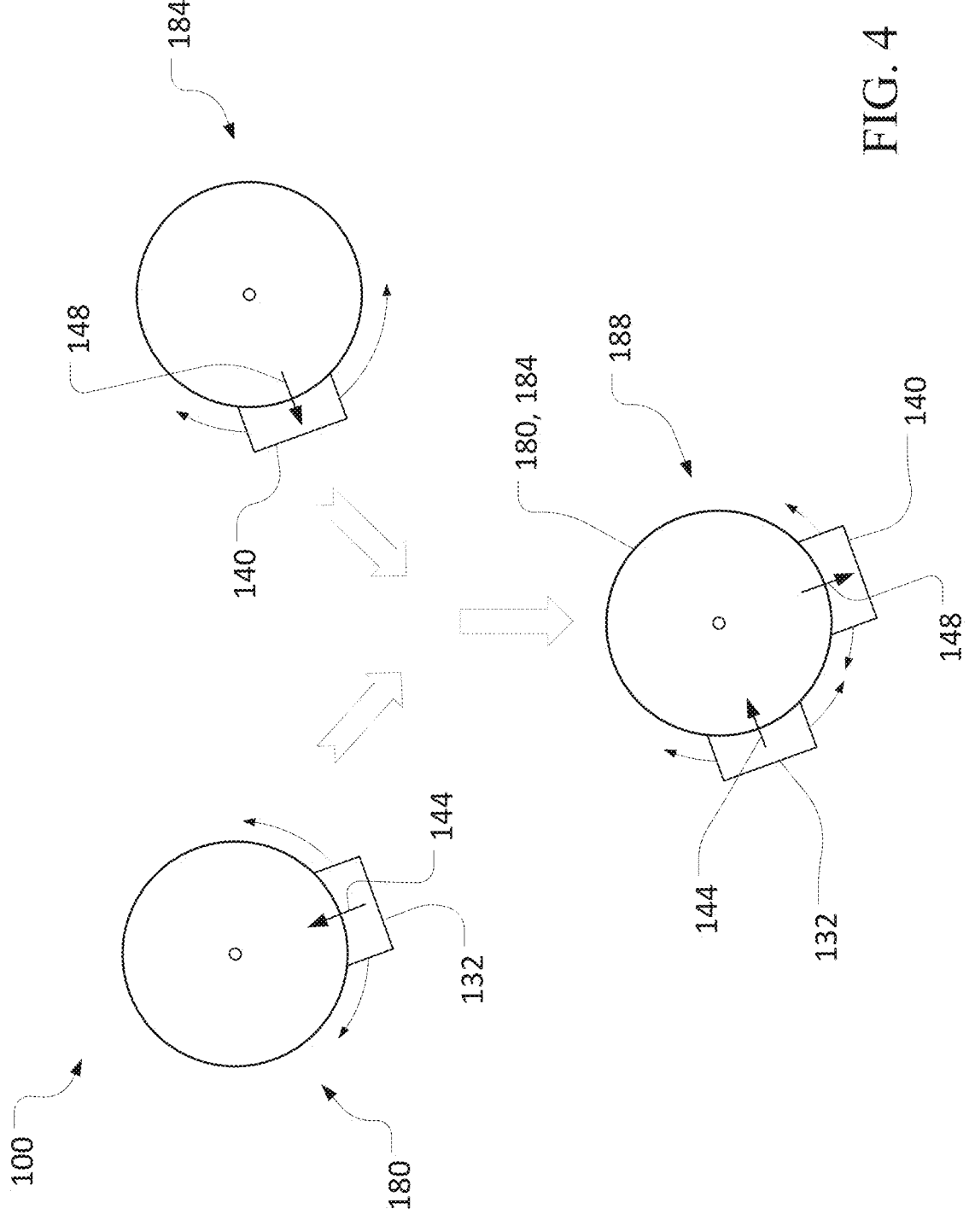
FIG. 4 is a schematic illustration of methods of configuring two valve portions of the globe valve assembly of FIG. 1.

As illustrated schematically in FIG. 4, for example, an upper body portion 180 and a lower body portion 184 can be formed separately (e.g. through 3D printing). These body portions 180, 184 can then be secured together to provide a combined body portion 188 with a particular valve configuration (e.g., to provide the valve body 108). In some cases, the upper body portion 180 and the lower body portion 184 can be integrally formed as the combined body portion 188 (e.g., with selective alignment of inlet and outlet flow orientations during manufacturing). In some embodiments, the upper body portion 180 and the lower body portion 184, formed separately or together, can be rotated relative to each other before or after being assembled together into the combined body portion 188.

In particular, the upper body portion 180 can define the inlet opening 132 and the lower body portion 184 can define the outlet opening 140 (see also FIG. 2). Correspondingly, the upper body portion 180 can be selectively rotatable relative to the lower body portion 184 (e.g., relative to the valve stem axis 112 (see FIG. 2)) to any of a plurality of angular orientations (as schematically illustrated for the combined body portion 188). Thus, particular configurations and relative orientations of the body portions 180, 184 can define any one of a plurality of desired angular offsets between the inlet flow orientation 144 and the outlet flow orientation 148. As also discussed above, this angular offset represents the angular difference between the inlet and outlet flow orientations, which is defined by the relative angular orientation of the body portions 180, 184 (in the illustrated example).

Thus, through the use of 3D printing and other fabrication technologies, some embodiments of the invention can provide a top-entry trim horizontal angle valve, with a vertical actuator orientation. More specifically, in some cases, this arrangement can allow faster and simplified access for maintenance and can eliminate common failure modes for traditional angle valves to provide extended reliability. Some embodiments of the invention can provide a 90-degree inlet to outlet offset (as shown). Other embodiments of the disclosed technology can provide custom casting patterns to accommodate an inlet or outlet angle relationship within a 360-degree pattern, thereby allowing a wider range of potential installation configurations.

Rotationally adjustable body portions can be secured together in various ways. For example, FIGS. 5A-5C illustrate arrangements to operably connect the upper body portion 180 and the lower body portion 184. In some examples, as illustrated in FIG. 5A, the upper body portion 180 and the lower body portion 184 can be connected with a bolted or other pinned connection 504 that extends through radially extending flanges 508. In some examples, as illustrated in FIG. 5B, the body portions can be connected with a clamp 512 around the radially extending flanges 508. In some examples, as illustrated in FIG. 5C, the upper body portion 180 and the lower body portion 184 can be arranged to have various interlocking features 516 for connection. The interlocking features 516 can, for example, be collectively (e.g., simultaneously) formed to align together using 3D printing techniques and then rotationally adjusted to define the desired relative angular orientation (i.e., to define the angular offset between the inlet flow orientation 144 and the outlet flow orientation 148, as discussed relative to FIG. 4). For example, the interlocking features 516 of the upper body portion 180 and the lower body portion 184 can be secured in a particular configurations using pins, clamps, welding, and other known techniques.

As noted above, in some embodiments, a bolted or other pinned connection 504 can be integrated between the upper body portion 180 and the lower body portion 184 to allow for easy indexing of inlet (or outlet) angular relationships required for various piping designs. The bolted or other pinned connection 504 can also allow for built-in swaging. By thus providing such built-in swaging, a pipe or tube can fit over another of the same diameter by increasing the diameter without the use of extra fittings. However, the use of a bolted or pinned connection may limit the number of potential angular offsets to a discrete set of predetermined configurations. In contrast, the examples of FIGS. 5B and 5C (and others) can provide continuous adjustability over a range of angular offsets, as can allow for still further customization of particular flow arrangements.

Figures 6A, 6B:
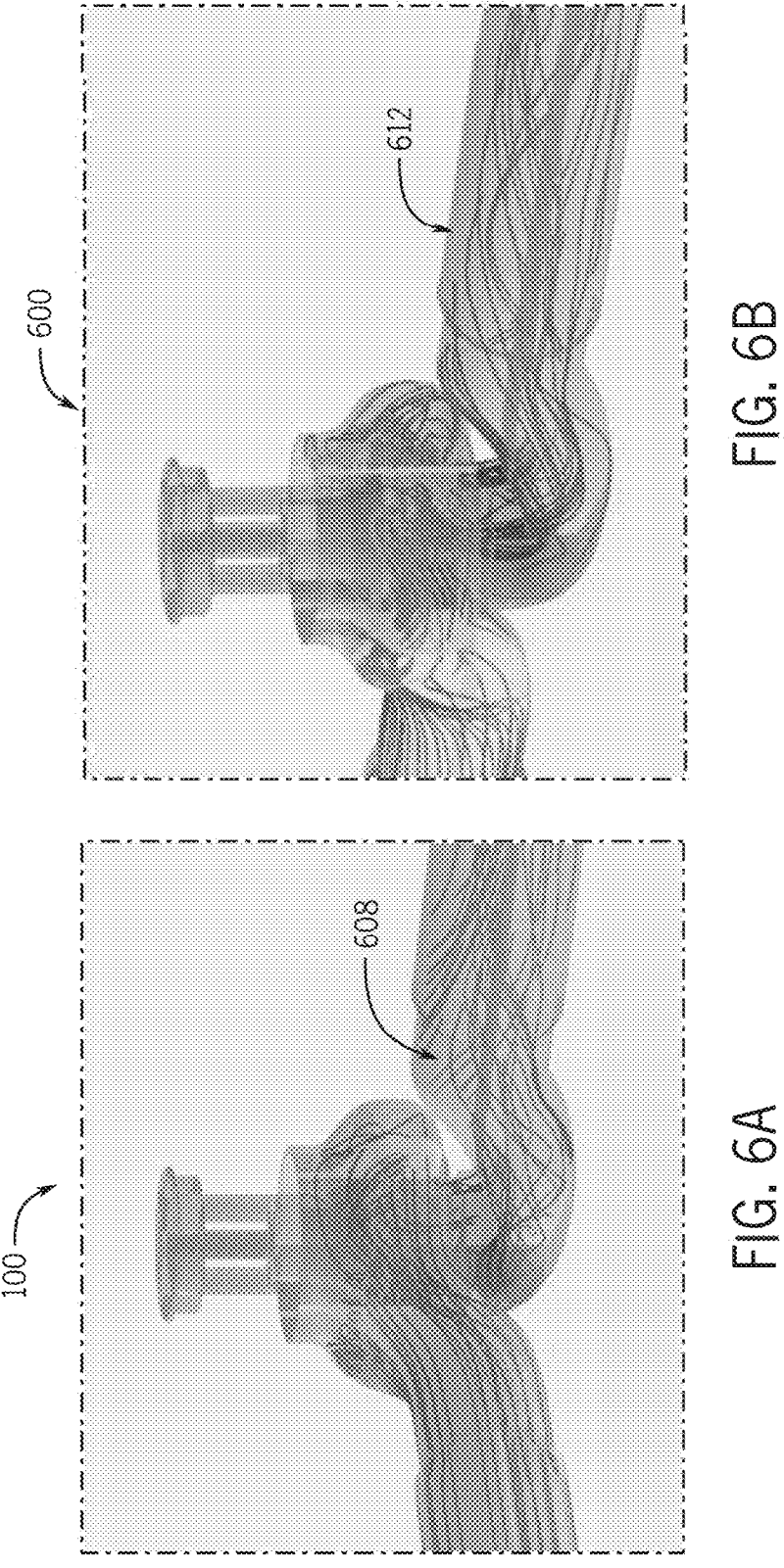
FIGS. 6A and 6B are schematic illustrations of flow streams of the globe valve assembly of FIG. 1 and another globe valve assembly, respectively, in a flow down configuration.
Figure 7B:
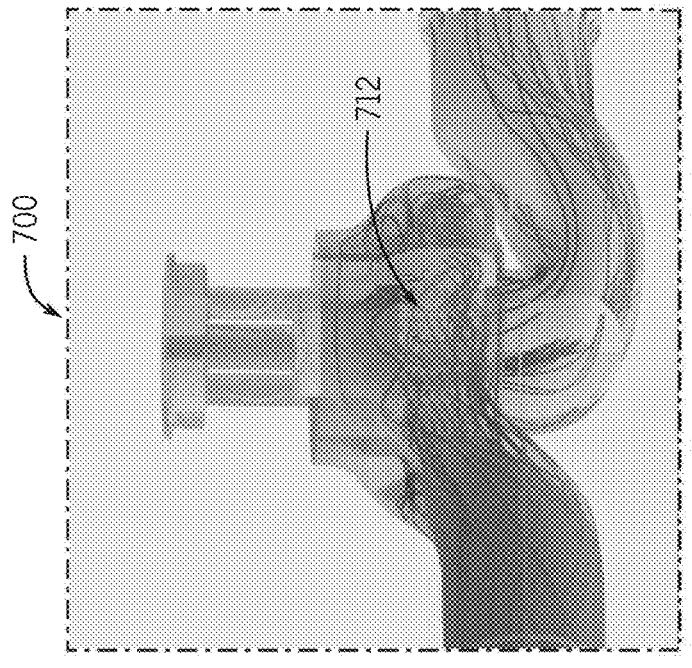
FIGS. 7A and 7B are schematic illustrations of flow streams of the globe valve assembly of FIG. 1 and another globe valve assembly, respectively, in a flow up configuration.
Figure 7A:
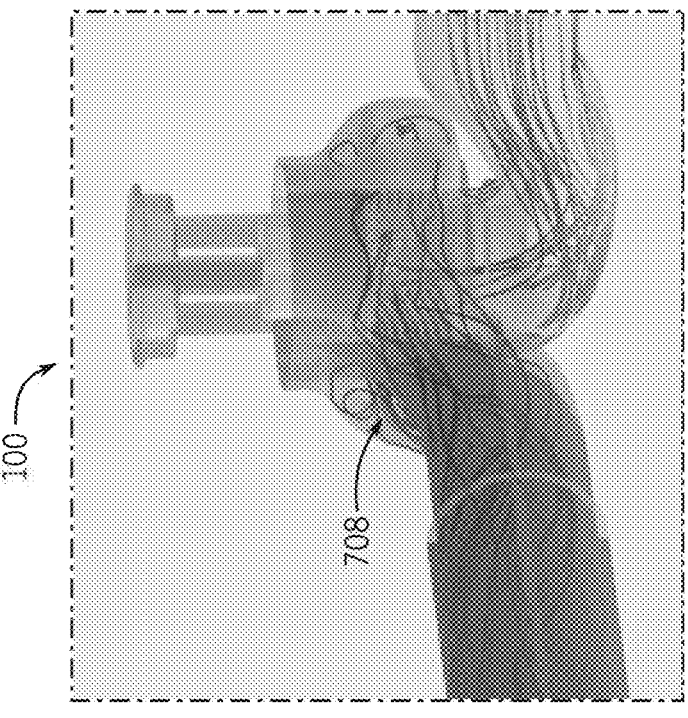

In contrast to conventional wisdom, it has been unexpectedly found that flow patterns for valves as disclosed herein can be equally or more favorable that flow patterns in conventional configurations. For example, FIGS. 6A, 6B, 7A and 7B illustrate comparisons of computed flow patterns for a globe valve assembly 600 with a traditional configuration and for the globe valve assembly 100. As shown in FIGS. 6A and 6B, for a flow down configuration, the comparison of the downstream (exit) flows 608, 612 show unexpected similarity in flow vectors between the valve assembly 100 (see FIG. 6A) and the traditional globe valve assembly 600 (see FIG. 6B). As shown in FIGS. 7A and 7B, for a flow up configuration, the comparison of the upwards flow streams 700 also show unexpected similarity in flow vectors, including for flows 708, 712 downstream of the valve seat. Indeed, the angular offset provided by the valve assembly 100 can provide an increased valve coefficient (e.g., by 30% of more) for flow up configurations (see FIGS. 7A and 7B), as may result from suppression of recirculation cells by the angular offset (e.g., particularly within a cage that surrounds the seat). In this regard, for example, the disclosed offset arrangements appear to suppress recirculation because the offset flow orientations can help to reduce alignment of downstream pressure gradients with the rotational direction of recirculation vortices near the valve seat. Thus, unexpectedly, the disclosed vertical offset can help to suppress undesirable flow structures as well provide increased flexibility relative to installation.

Thus, embodiments of the invention can provide an improved globe valve assembly design. In some embodiments, for example, through the use of various fabrication technologies (e.g. 3D printing), a globe valve assembly can provide a wide range of rotational configurations while maintaining a vertical actuator orientation and eliminating the need for piping elbows. Further, angularly offset inlet and outlet flow orientations can provide generally improved flow characteristics in some configurations, with corresponding benefits for overall efficiency of the relevant flow system.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "only one of," or "exactly one of." For example, a list of "only one of A, B, or C" indicates options of: A, but not B and C; B, but not A and C; and C, but not A and B. In contrast, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more A, one or more B, and one or more C. Similarly, a list preceded by "a plurality of" (and variations thereon) and including "or" to separate listed elements indicates options of one or more of each of multiple of the listed elements. For example, the phrases "a plurality of A, B, or C" and "two or more of A, B, or C"

indicate options of: one or more A and one or more B; one or more B and one or more C; one or more A and one or more C; and one or more A, one or more B, and one or more C.

Also as used herein, unless otherwise limited or defined, "substantially perpendicular" indicates a direction that is within ±12 degrees of perpendicular a reference direction (e.g., within ±6 degrees or ±3 degrees), inclusive. For a path that is not linear, the path can be considered to be substantially perpendicular to a reference direction if a straight line between end-points of the path is substantially perpendicular to the reference direction or a mean derivative (i.e., mean local slope) of the path within a common reference frame as the reference direction is substantially perpendicular to the reference direction.

Also as used herein, unless otherwise limited or defined, "substantially parallel" indicates a direction that is within ±12 degrees of a reference direction (e.g., within ±6 degrees or ±3 degrees), inclusive. Correspondingly, "substantially vertical" indicates a direction that is substantially parallel to the vertical direction, as defined relative to the reference system (e.g., for a building, relative to a plumb vertical line as can generally correspond to the direction of in-wall studs), with a similarly derived meaning for "substantially horizontal" (relative to the horizontal direction, as can generally correspond to the direction that spaces adjacent in-wall studs apart from each other).

Also as used herein, unless otherwise limited or defined, "integral" and derivatives thereof (e.g., "integrally") describe elements that are manufactured as a single piece without fasteners, adhesive, or the like to secure separate components together. For example, an element that is stamped, cast, or otherwise molded as a single-piece component from a single piece of sheet metal or other continuous single piece of material, without rivets, screws, other fasteners, or adhesive to hold separately formed pieces together, is an integral (and integrally formed) element. In contrast, an element formed from multiple pieces that are separately formed initially then later connected together, is not an integral (or integrally formed) element.

Also as used herein, unless otherwise defined or limited, directional terms are used for convenience of reference for discussion of particular figures or examples or to indicate spatial relationships relative to particular other components or context, but are not intended to indicate absolute orientation. For example, references to downward, forward, or other directions, or to top, rear, or other positions (or features) may be used to discuss aspects of a particular example or figure, but do not necessarily require similar orientation or geometry in all installations or configurations.

Also as used herein, unless otherwise specified or limited, an opening for a flow passage defines a "flow orientation" that corresponds to either of (a) a direction perpendicular to a plane of the opening or (b) an average direction of flow as defined by the flow passage over a distance from the opening that is equal to one diameter or one effective diameter (i.e., cross-sectional area divided by $2\pi$). In some examples, a connection face on a valve can present a planar (e.g., annular) surface that can also correspond to a plane of a flow opening, and flow orientation can be accordingly defined perpendicularly to the connection face. Depending on a bulk direction of flow through an opening for a particular application, a flow orientation can generally be an inlet (i.e., inbound) flow orientation or an outlet (i.e., outbound) flow orientation. With respect to flow within a valve, reference can also be made to configurations with a "flow up direction" (also known as "flow under plug"), in which fluid moves through a throttling orifice (e.g., across a valve seat)

from bottom to top, and configurations with a "flow down direction" (also known as "flow over plug"), in which fluid moves through a throttling orifice (e.g., across a valve seat) from top to bottom.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A globe valve assembly comprising:
   a globe valve that includes:
      a valve stem that defines a valve stem axis;
      a valve seat;
      a plug secured at a distal end of the valve stem to be moved relative to the valve seat by movement of the valve stem to control flow across the valve seat; and
      a valve body that supports the valve seat, the valve body defining an inlet passage that extends between an inlet opening and the valve seat and an outlet passage that extends between an outlet opening and the valve seat;
   wherein the inlet opening defines an inlet flow orientation and the outlet opening defines an outlet flow orientation; and
   wherein, as projected onto a reference plane that is perpendicular to the valve stem axis, the inlet flow orientation extends at an oblique angle relative to the outlet flow orientation.

2. The globe valve assembly of claim 1, wherein the inlet flow orientation and the outlet flow orientation are substantially parallel to the reference plane.

3. The globe valve assembly of claim 2, wherein the inlet flow orientation and the outlet flow orientation are aligned along the reference plane.

4. The globe valve assembly of claim 3, further comprising:
   a bonnet secured to a top of the valve body, the bonnet including a stem passage to guide movement of the valve stem and at least one packing set arranged within the stem passage.

5. The globe valve assembly of claim 1, wherein the globe valve is secured to an inlet flow conduit at the inlet opening and is secured to an outlet flow conduit at the outlet opening, so that the plug is arranged to control flow from the inlet flow conduit to the outlet flow conduit via the globe valve; and
   wherein the valve stem axis is substantially vertical.

6. The globe valve assembly of claim 5, wherein one or more of the inlet flow orientation or the outlet flow orientation are substantially horizontal.

7. The globe valve assembly of claim 6, wherein the inlet flow orientation and the outlet flow orientation are substantially horizontal.

8. The globe valve assembly of claim 1, wherein the valve body is an integrally formed body.

9. The globe valve assembly of claim 1, wherein the valve body is an additively formed body.

10. The globe valve assembly of claim 1, wherein the valve body includes an upper body portion and a lower body portion configured to be selectively secured together at any of a plurality of relative angular orientations to define an oblique angle between the inlet flow orientation and the outlet flow orientation.

11. A method of forming a globe valve assembly, the method comprising:
   forming a valve body to support a valve seat, wherein the valve body defines: an inlet opening, an outlet opening, a seat passage for flow across the valve seat, an inlet passage that extends between the inlet opening and the seat passage, and an outlet passage that extends between the outlet opening and the seat passage;
   positioning a valve stem within the valve body, the valve stem defining a valve stem axis; and
   arranging the inlet passage at an oblique angle relative to the outlet passage when viewed from a reference plane extending perpendicular to the valve stem axis.

12. The method of claim 11, further comprising:
   securing the valve stem to the valve body to control flow across the valve seat by moving a plug at a distal end of the valve stem relative to the valve seat.

13. The method of claim 12, wherein securing the valve stem to the valve body includes securing a bonnet to a top side of the valve body, the bonnet including a stem passage that receives the valve stem along the valve stem axis, and at least one packing set arranged around the valve stem within the stem passage.

14. The method of claim 11, wherein forming the valve body includes integrally forming the valve body.

15. The method of claim 11, wherein forming the valve body includes additively forming one or more body portions of the valve body.

16. The method of claim 15, wherein the one or more body portions include:
   an upper body portion; and
   a lower body portion; and
   wherein the upper body portion is selectively rotatable relative to the lower body portion to any of a plurality of angular orientations to define a corresponding angular offset between an inlet connection of the valve body and an outlet connection of the valve body.

17. A method of installing a globe valve assembly, the method comprising:
   providing a globe valve that includes valve body that supports a valve seat, a valve stem movably secured to the valve body to define a valve stem axis, a plug secured at a distal end of the valve stem to be moved relative to the valve seat by movement of the valve stem to control flow across the valve seat, the valve body defining an inlet passage that extends between an inlet opening and the valve seat and an outlet passage that extends between an outlet opening and the valve seat;
   aligning the inlet opening at an oblique angle relative to the outlet opening when viewed from a reference plane extending perpendicular to the valve stem axis; and
   securing an inlet flow conduit at the inlet opening and an outlet flow conduit at the outlet opening.

18. The method of claim 17, wherein the globe valve further includes a bonnet secured to a top of the valve body, the bonnet including a vertical stem passage to guide movement of the valve stem and at least one packing set that surrounds the valve stem within the vertical stem passage.

* * * * *